(12) United States Patent
Lee et al.

(10) Patent No.: US 11,548,364 B2
(45) Date of Patent: Jan. 10, 2023

(54) VEHICLE BODY CONNECTION STRUCTURE

(71) Applicants: Hyundai Motor Company, Seoul (KR); Kia Corporation, Seoul (KR)

(72) Inventors: Kang Chul Lee, Seoul (KR); Joonghyun Shin, Hwaseong-si (KR); Jung Jong Chun, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 83 days.

(21) Appl. No.: 17/326,639

(22) Filed: May 21, 2021

(65) Prior Publication Data
US 2022/0126665 A1    Apr. 28, 2022

(30) Foreign Application Priority Data
Oct. 27, 2020   (KR) .......................... 10-2020-0140441

(51) Int. Cl.
| | | |
|---|---|---|
| *B60J 7/00* | (2006.01) | |
| *B60K 1/04* | (2019.01) | |
| *B62D 25/02* | (2006.01) | |
| *B62D 25/20* | (2006.01) | |
| *B62D 29/00* | (2006.01) | |
| *B62D 25/04* | (2006.01) | |

(52) U.S. Cl.
CPC .............. *B60K 1/04* (2013.01); *B62D 25/025* (2013.01); *B62D 25/04* (2013.01); *B62D 25/2036* (2013.01); *B62D 29/008* (2013.01); *B60K 2001/0438* (2013.01)

(58) Field of Classification Search
CPC .............. B60K 1/04; B60K 2001/0438; B60K 2001/0472; Y02E 60/10; Y02T 10/70; H01M 50/20; B60L 50/66; F16B 13/0808
See application file for complete search history.

(56) References Cited

U.S. PATENT DOCUMENTS

| | | | | |
|---|---|---|---|---|
| 3,321,236 A | * | 5/1967 | Sewelin ............. | B62D 33/0604 296/35.1 |
| 2013/0088045 A1 | * | 4/2013 | Charbonneau ..... | B62D 25/2036 296/187.12 |
| 2022/0194482 A1 | * | 6/2022 | Song .................... | B62D 25/025 |

* cited by examiner

*Primary Examiner* — Kiran B Patel
(74) *Attorney, Agent, or Firm* — Slater Matsil, LLP

(57) ABSTRACT

An embodiment vehicle body connection structure for connecting an underbody on which a battery assembly is mounted and an upper body includes a plurality of main mounting portions engaging the battery assembly, a chassis frame on both sides of the underbody and side sills on both sides of the upper body along a length direction of the upper body through a main engage unit.

20 Claims, 7 Drawing Sheets

VEHICLE BODY CONNECTION STRUCTURE

CROSS-REFERENCE TO RELATED APPLICATIONS

This application claims the benefit of Korean Application No. 10-2020-0140441, filed on Oct. 27, 2020, which application is hereby incorporated herein by reference.

TECHNICAL FIELD

The present invention relates to a vehicle body connection structure.

BACKGROUND

Recently, the vehicle industry has introduced a new concept of future mobility vision for realizing a dynamic human-centered future city. One of these future mobility solutions is a PBV (Purpose Built Vehicle) as a purpose-based mobility.

A PBV is an environment-friendly mobility solution that provides the customized service required for occupants during the time of moving to the destination, and it can perform optimal path predetermination and cluster driving for each situation using electric vehicle-based and artificial intelligence.

The PBV includes an underbody as a chassis (also referred to as a rolling chassis or skateboard in the industry) and an upper body as a vehicle body mounted on the underbody. Here, the battery assembly is mounted on the underbody. And the upper body may be a space frame formed by welding a steel plate or pipe to form a skeleton.

Furthermore, the upper body and the underbody are mutually engaged through a cabin bracket, and the battery assembly is engaged inside the edge of the underbody.

The general battery assembly is limited in width increase, and may cause an increase in the mounting part of the upper body and the underbody, and the mounting part of the battery assembly and the underbody.

In addition, as the space for absorbing impact between the underbody and the battery assembly is insufficient, it may cause damage to the battery assembly and damage to the occupant during a side impact.

The above information disclosed in this Background section is only for enhancement of understanding of the background of the invention, and therefore it may contain information that does not form the prior art that is already known to a person of ordinary skill in the art.

SUMMARY

The present invention relates to a vehicle body connection structure. Particular embodiments relate to a vehicle body connection structure of a Purpose Built Vehicle (PBV).

Embodiments of the present invention provide a vehicle body connection structure that increases the connection strength between the underbody and the upper body, enables minimization of the mounting parts of the underbody and the upper body, and secures side impact stability.

A vehicle body connection structure according to an exemplary embodiment of the present invention may include an underbody on which a battery assembly is mounted and an upper body coupled to the underbody. The vehicle body connection structure may include at least two main mounting portions engaging the battery assembly, the chassis frame on both sides of the underbody and side sills on both sides of the upper body along the vehicle body length direction through a main engage unit.

The vehicle body connection structure may further include at least two sub mounting portions engaging the battery assembly and the chassis frame through a sub engage unit between the main mounting portions.

The main mounting portions may be connected to the lower part of the front, center and rear pillar of the upper body.

The battery assembly may include an engage flange formed on an edge of a battery case of the battery assembly and engaged with the chassis frame by the main engage unit and the sub engage unit.

An impact absorption space may be formed between the edge of the battery case and the chassis frame.

The vehicle body connection structure may further include a tooling pin provided on the engage flange and fitted to the chassis frame and the side sill.

The chassis frame and the side seal may be formed of an aluminum extruded material including closed sections partitioned by partition walls.

The main engage unit may include a first blind nut attached to the side sill, and a first mounting bolt that penetrates the battery assembly and the chassis frame and engages the first blind nut.

The sub engage unit may include a second blind nut coupled to the chassis frame, and a second mounting bolt that penetrates the battery assembly and engages the second blind nut.

The vehicle body connection structure may further include a side sill trim coupled to the outside of the chassis frame.

In an exemplary embodiment of the present invention, the number of mountings for assembling of the underbody and upper body may be minimized, the width of the battery assembly may be maximized, and collision stability of the vehicle may be secured.

In addition, the effects obtained or predicted by exemplary embodiments of the present invention will be disclosed directly or implicitly in the detailed description of exemplary embodiments of the present invention. That is, various effects predicted according to exemplary embodiments of the present invention will be disclosed within a detailed description to be described later.

BRIEF DESCRIPTION OF THE DRAWINGS

Since these drawings are for reference only to explain exemplary embodiments of the present invention, the technical idea of the present invention should not be interpreted as being limited to the accompanying drawings.

Figure 1A:
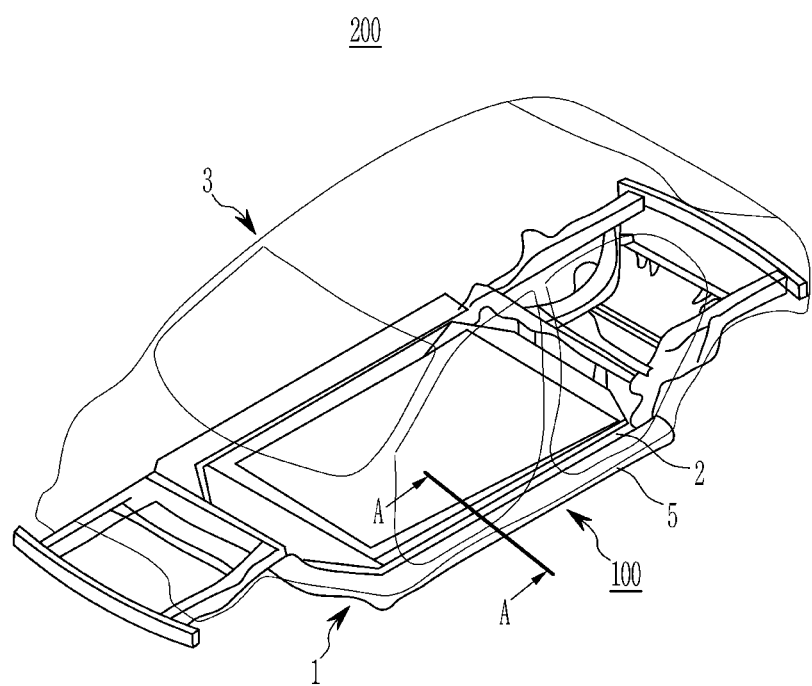
FIG. 1A and FIG. 1B are a perspective view and a side view, respectively, of a PBV applied to a vehicle body connection structure according to an exemplary embodiment of the present invention.

The following elements may be used in connection with the drawings to describe embodiments of the present invention.

| | |
|---|---|
| 1: underbody | 2: battery assembly |
| 2a: battery case | 2b: engage flange |
| 3: upper body | 5: chassis frame |
| 6, 8: wall | 7: side sill |
| 9a, 9b: closed section | 10: main mounting portion |
| 11: main engage unit | 13: first blind nut |
| 15: first mounting bolt | 50: sub mounting portion |
| 51: sub engage unit | 53: second blind nut |
| 55: second mounting bolt | 61: impact absorption space |
| 71: side sill trim | 91: tooling pin |
| A, B, C: front, center, rear pillar | |
| 100: vehicle body connection structure | |
| 200: vehicle | |

DETAILED DESCRIPTION OF ILLUSTRATIVE EMBODIMENTS

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In order to clearly describe embodiments of the present invention, parts irrelevant to the description are omitted, and the same reference numerals are attached to the same or similar components throughout the specification.

Since the size and thickness of each component shown in the drawings are arbitrarily shown for convenience of description, embodiments of the present invention are not necessarily limited to what is shown in the drawings, and the thickness is enlarged to clearly express various parts and regions.

In addition, in the following detailed description, the names of the configurations are divided into first, second, etc. to distinguish the configurations in the same relationship, and are not necessarily limited to the order in the following description.

Throughout the specification, when a part includes a certain component, it means that other components may be further included rather than excluding other components unless specifically stated to the contrary.

In addition, terms such as . . . unit, . . . means, etc. described in the specification mean a unit of a comprehensive structure that performs at least one function or operation.

Figure 1B:
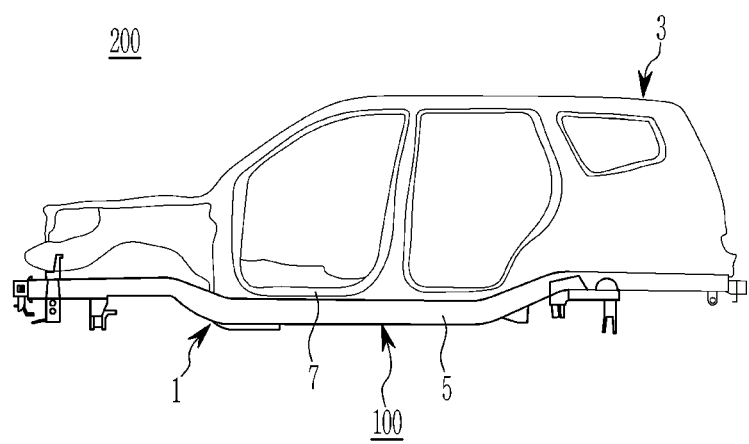

FIG. 1A and FIG. 1B are a perspective view and a side view, respectively, of a PBV applied to a vehicle body connection structure according to an exemplary embodiment of the present invention.

Referring to FIG. 1A and FIG. 1B, the vehicle body connection structure 100 according to an exemplary embodiment of the present invention may be applied to a Purpose Built Vehicle (PBV) 200 such as an electric vehicle-based unmanned mobile vehicle.

Such a PBV 200 includes a skateboard type underbody 1 (also referred to as a rolling chassis in the art) as a chassis, and an upper body 3 as a vehicle body mounted on the underbody 1.

A battery assembly 2 is mounted on the underbody 1, and a chassis frame 5 is mounted on both sides. The upper body 3 includes side sills 7 constituting the cabin. Here, the upper body 3 may be a space frame that forms a skeleton by connecting a steel plate or a pipe.

In the industry, the vehicle width direction is called the L direction, the vehicle body length direction (vehicle body front and rear direction) is called the T direction, and the height direction of the vehicle body is called the H direction. However, in exemplary embodiments of the present invention, instead of setting the LTH direction as described above as the reference direction, the constituent elements in the following will be described by setting the vehicle width direction, the vehicle body length direction and the up and down (vertical) direction.

In addition, the end in the following may be defined as either end, and is defined as a certain part including the end.

The vehicle body connection structure 100 according to an exemplary embodiment of the present invention may maximize the width of the battery assembly 2 mounted on the underbody 1, minimize the mounting portion that connects the underbody 1, the battery assembly 2 and the upper body 3, respectively, and secure side impact stability.

Figure 2:
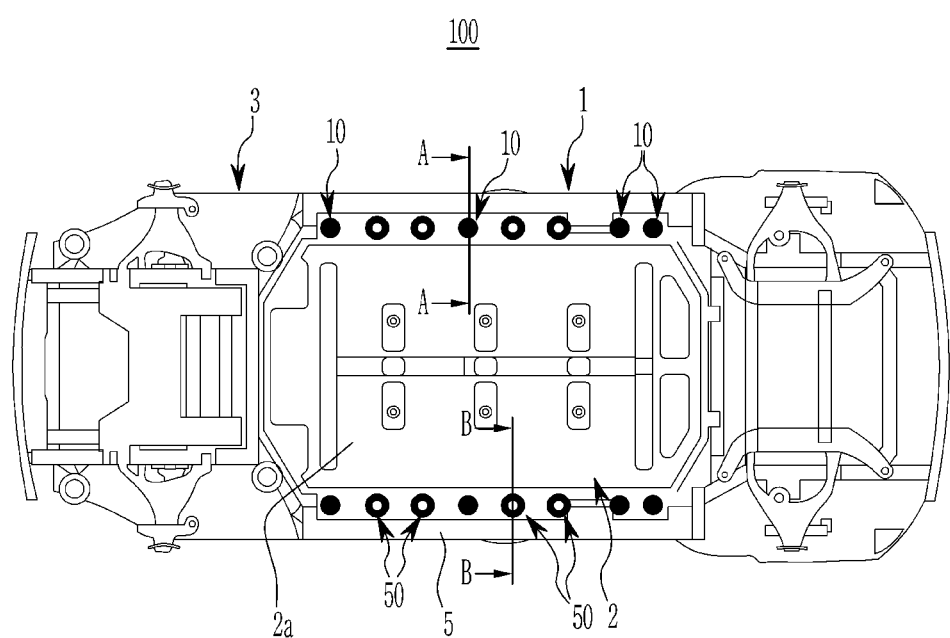
FIG. 2 is a drawing showing a vehicle body connection structure according to an exemplary embodiment of the present invention.

FIG. 2 is a drawing showing a vehicle body connection structure according to an exemplary embodiment of the present invention.

Referring to FIG. 1A, FIG. 1B and FIG. 2, the vehicle body connection structure 100 according to an exemplary embodiment of the present invention may include a plurality of main mounting portions 10 and a plurality of sub mounting portions 50.

Figure 3:
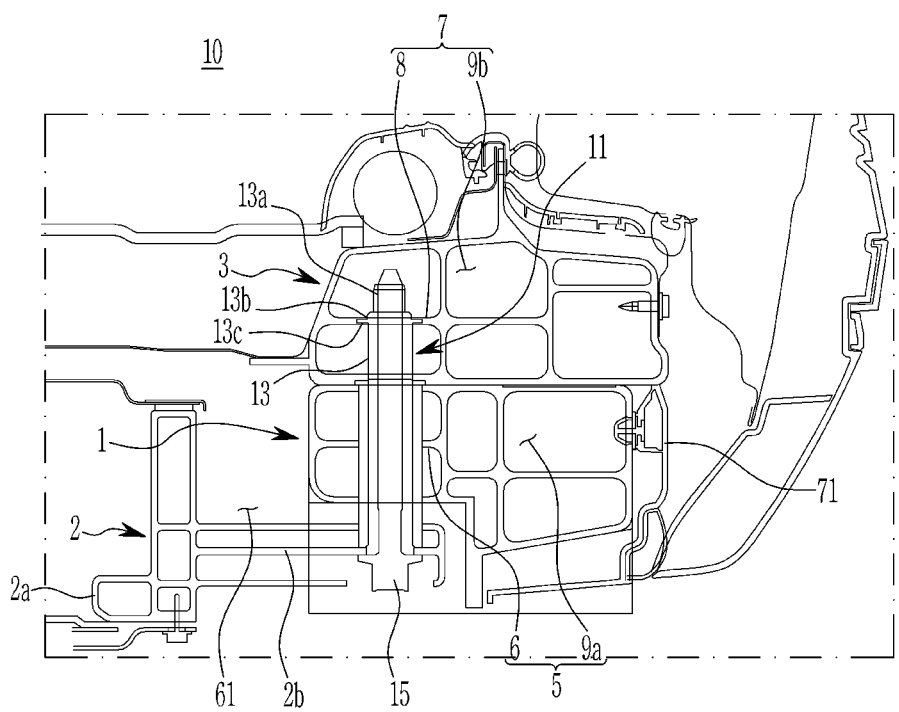
FIG. 3 is a cross-sectional view along line A-A of FIG. 2.

FIG. 3 is a cross-sectional view along line A-A of FIG. 2.

Referring to FIG. 3, the underbody 1 includes the chassis frame 5, and the upper body 3 includes the side sill 7.

The chassis frame 5 and the side sill 7 each include a plurality of closed sections 9a and 9b divided by a plurality of walls 6 and 8, and may be formed of an aluminum extruded material.

The battery assembly 2 includes a battery case 2a for accommodating battery modules and an engage flange 2b formed at the edge of the battery case 2a.

In an exemplary embodiment of the present invention, the main mounting portions 10 may integrally connect both sides of the chassis frame 5 of the underbody 1, the engage flange 2b of the battery assembly 2, and both side sills 7 of the upper body 3 through a main engage unit 11 in the vehicle body length direction.

The main engage unit 11 includes a first blind nut 13 and a first mounting bolt 15.

The first blind nut 13 is inserted into the wall 8 inside the side sill 7 through an engage hole formed in the lower part of the side sill 7, and includes a nut portion 13a, a weak portion 13b and a support end 13c supporting an edge portion of the engage hole.

The first blind nut 13 is a configuration of a well-known technology in the art, and a more detailed description of the configurations in this specification will be omitted.

The first mounting bolt 15 may be a long bolt including a bolt head formed at the lower end of the bolt rod, and having a screw thread formed at the upper end of the bolt rod, based on the drawing.

The first mounting bolt 15 penetrates the engage flange 2b of the battery assembly 2 and the chassis frame 5 from the bottom to the top, and engages the nut portion 13a of the first blind nut 13.

When the first mounting bolt 15 penetrates the engage flange 2b of the battery assembly 2 and the chassis frame 5 and is engaged with the nut portion 13a of the first blind nut 13, the weak portion 13b of the first blind nut 13 extends outward. As it is deformed, it is joined to the inside of the side sill 7 through its extended deformation and the support end 13c.

Accordingly, the main engage unit 11 may integrally combine both sides of the chassis frame 5 of the underbody 1, the engage flange 2b of the battery assembly 2, and both side sills 7 of the upper body 3 through the first mounting bolt 15 engaged with the first blind nut 13.

Figure 4:
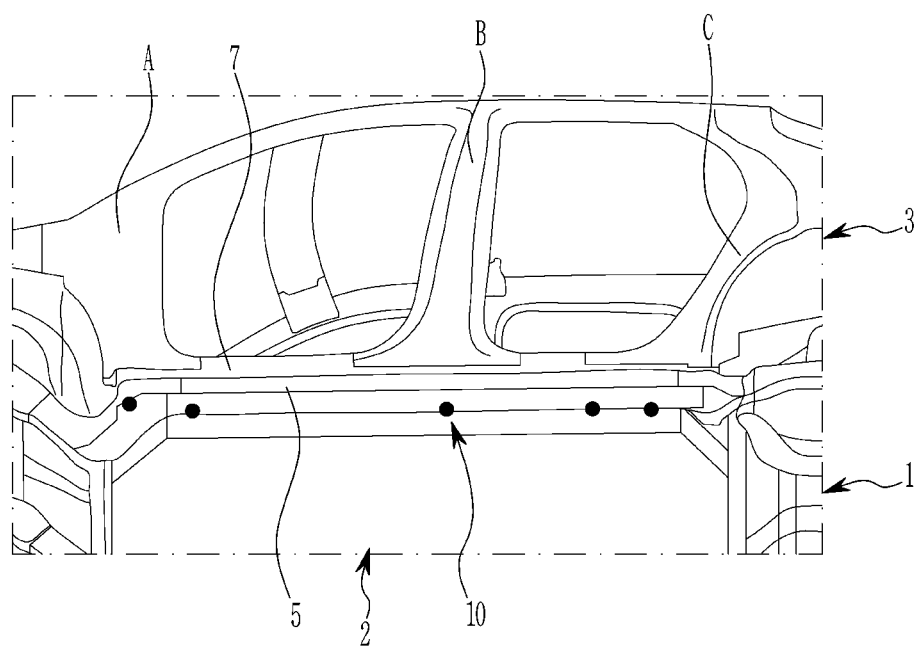
FIG. 4 is a drawing showing positions of main mounting pails applied to a vehicle body connection structure according to an exemplary embodiment of the present invention.

FIG. 4 is a drawing showing positions of main mounting parts applied to a vehicle body connection structure according to an exemplary embodiment of the present invention.

The main mounting portions 10 are connected to the lower part of the front pillar A, the center pillar B and the rear pillar C of the upper body 3.

Figure 5:
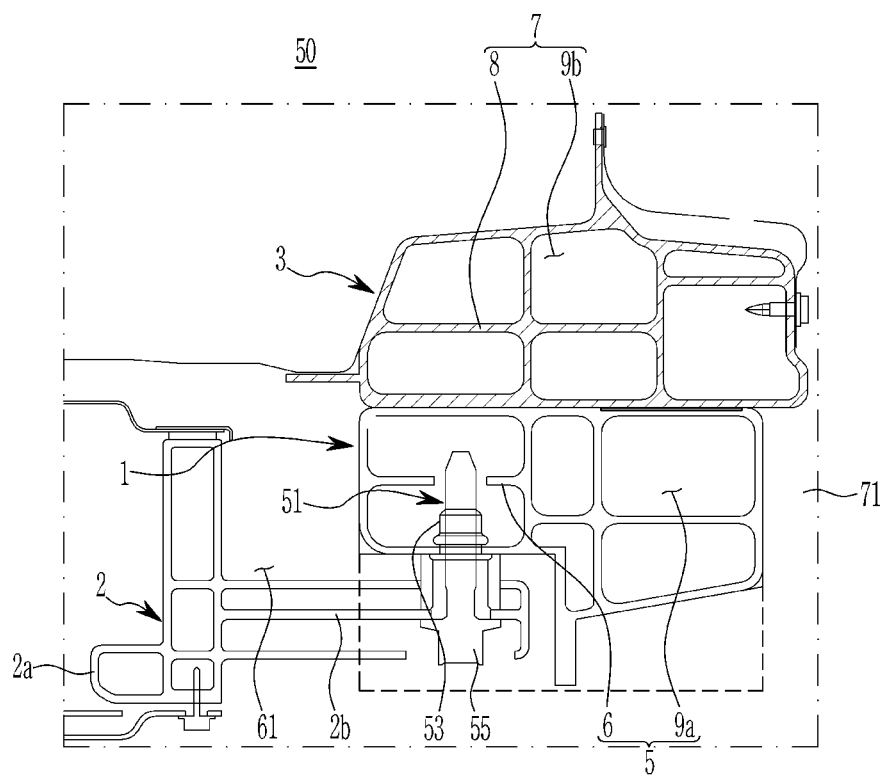
FIG. 5 is a cross-sectional view along line B-B of FIG. 2.

FIG. 5 is a cross-sectional view along line B-B of FIG. 2.

Referring to FIG. 2 and FIG. 5, in an exemplary embodiment of the present invention, the sub mounting portions 50 are for integrally engaging the engage flange 2b of the battery assembly 2 and the chassis frame 5 through a sub engage unit 51.

The sub engage unit 51 includes a second blind nut 53 and a second mounting bolt 55.

The second blind nut 53 is inserted into the wall 6 inside the chassis frame 5 through the engage hole in the lower part of the chassis frame 5. The second blind nut 53 may include a nut portion, a weak portion and a support end supporting the edge portion of the engage hole.

Detailed configurations of the nut portion, the weak portion, and the support end of the second blind nut 53 are the same as/similar to the first blind nut 13 described with reference to FIG. 3, and thus a detailed description thereof will be omitted.

The second mounting bolt 55 includes a bolt head formed at the lower end of the bolt rod, and a thread formed at the upper end of the bolt rod, based on the drawing.

The second mounting bolt 55 penetrates the engage flange 2b of the battery assembly 2 from the bottom to the top, is coupled to the bolt joint of the second blind nut 53, and is attached to the nut portion of the second blind nut 53 through the thread of the upper end.

When the second mounting bolt 55 penetrates the engage flange 2b of the battery assembly 2 and engages in the nut portion of the second blind nut 53, the second blind nut 53 expands and deforms the weak portion outward, and the second blind nut 53 is coupled to the inside of the chassis frame 5 through the extended deformation part and the support end as the weak portion expands to the outside.

Accordingly, the sub engage unit 51 may integrally combine the engage flange 2b of the battery assembly 2 and the chassis frame 5 of the underbody 1 through the second mounting bolt 55 engaged with the second blind nut 53.

A side sill trim 71 is connected on the outside of the chassis frame 5 combined to the side sill 7 of the upper body 3 in the up and down directions.

Figure 6:
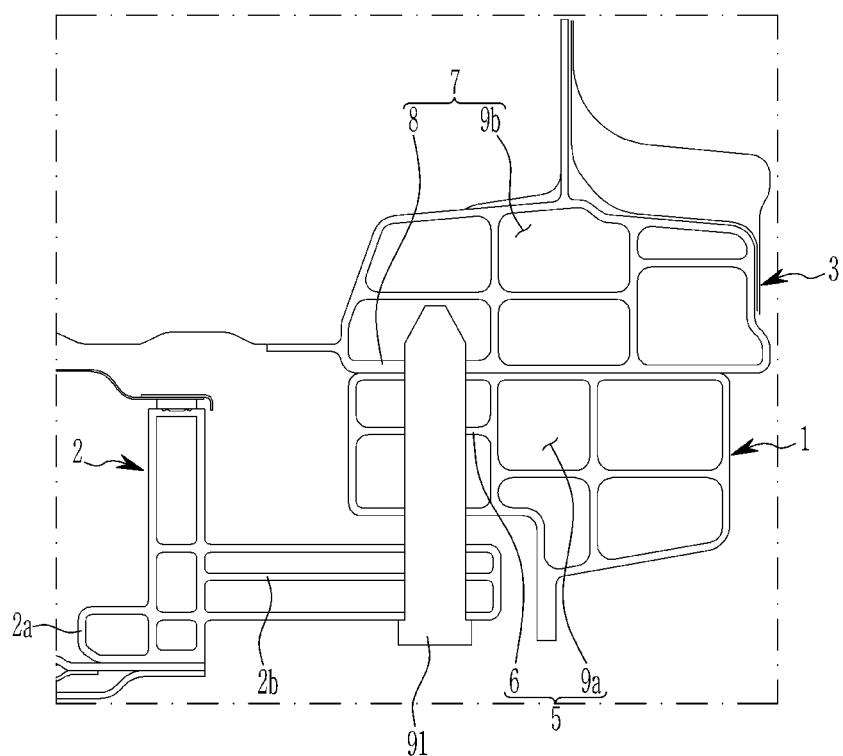
FIG. 6 is a drawing showing a tooling pin applied to a vehicle body connection structure according to an exemplary embodiment of the present invention.

FIG. 6 is a drawing showing a tooling pin applied to a vehicle body connection structure according to an exemplary embodiment of the present invention.

Referring to FIG. 6, the engage flange 2b of battery assembly 2 is provided with a tooling pin 91. The tooling pin 91 is fixed in the up and down directions to the engage flange 2b.

The tooling pin 91 is inserted into the chassis frame 5 of the underbody 1 and the side sill 7 of the upper body 3 when the underbody 1 and the upper body 3 are assembled. And the tooling pin 91 guides the upper and lower assembly of the underbody 1 and the upper body 3, limits the mount positions of the underbody 1 and the upper body 3, and absorbs the upper and lower assembly tolerances of the underbody 1 and the upper body 3.

An assembly process of the vehicle body connection structure 100 according to an exemplary embodiment of the present invention configured as described above will be described. First of all, in an exemplary embodiment of the present invention, while the battery assembly 2 is loaded on the underbody 1, the tooling pin 91 provided on the engage flange 2b of the battery assembly 2 is connected to the chassis frame 5 of the underbody 1 in the upper direction. Then, the tooling pin 91 is inserted into the side sill 7 of the upper body 3 in the upper direction.

Then, in an exemplary embodiment of the present invention, the tooling pin 91 guides the upper and lower assembly of the underbody 1 and the upper body 3, limits the mount positions of the underbody 1 and the upper body 3, and absorbs the upper and lower assembly tolerances of the underbody 1 and the upper body 3.

In this state, the first blind nut 13 of the main engage unit 11 is inserted into the wall 8 inside the side sill 7 through the engage hole of the side sill 7. Then, the first mounting bolt 15 is inserted into the engage flange 2b of the battery assembly 2 and the chassis frame 5, and is engaged with the nut portion 13a of the first blind nut 13.

The weak portion 13b of the first blind nut 13 is expanded and deformed outward by the engaging force of the first mounting bolt 15, and the first mounting bolt 15 is placed inside the side sill 7 through the extended deformation portion 13b and support end 13c.

Therefore, the main engage unit 11 integrally combines both sides of the chassis frame 5 of the underbody 1, the engage flange 2b of the battery assembly 2, and both sides of the side sill 7 of the upper body 3 through the first mounting bolt 15 engaged with the first blind nut 13. The main engage unit 11 forms a plurality of main mounting portions 10 along the vehicle body length direction.

Then, in an exemplary embodiment of the present invention, the second blind nut 53 of the sub engage unit 51 is inserted into the wall 6 inside the chassis frame 5 through the engage hole of the chassis frame 5, and the second mounting bolt 55 is inserted into the engage flange 2b of the battery assembly 2, and is engaged with the nut portion of the second blind nut 53.

The second blind nut 53 is coupled to the inside of the chassis frame 5 through the extended deformation part and the support end as the weak portion is expanded and deformed outward by the engaging force of the second mounting bolt 55.

Therefore, the sub engage unit 51 integrally combines the engage flange 2b of the battery assembly 2 and the chassis frame 5 on both sides of the underbody 1 through the second mounting bolt 55 engaged with the second blind nut 53, and the sub engage unit 51 may form a plurality of sub mounting portions 50 between the main mounting portions 10.

As the engage flange 2b of the battery assembly 2 as described above is engaged with the chassis frame 5 by the main engage unit 11 and the sub engage unit 51, an impact absorption space 61 may be formed between the edge portion of the battery case 2a and the chassis frame 5 by the engage flange 2b.

According to the vehicle body connection structure 100 according to an exemplary embodiment of the present invention, the underbody 1 of the skateboard type and the upper body 3 of the space frame type may be fastened in the vertical direction by the main mounting portion 10 and the sub mounting portion 50.

In an exemplary embodiment of the present invention, the chassis frame 5 on both sides of the underbody 1, the battery assembly 2, and the side sill 7 of the upper body 3 may be integrally engaged through the main engage unit 11 of the main mounting portions 10. Thus, the number of mountings for the assembly of the underbody 1 and the upper body 3 may be minimized.

Furthermore, in an exemplary embodiment of the present invention, the chassis frame 5 on both sides of the underbody 1, the battery assembly 2, and the side sills 7 on both sides of the upper body 3 are integrated through the first blind nut 13 of the main engage unit 11 and the first mounting bolt 15. By engaging, it is possible to increase the connection force of the underbody 1, the battery assembly 2 and the upper body 3.

Furthermore, in an exemplary embodiment of the present invention, the main mounting portion 10 is configured on the front, center and rear pillar sides, and the impact absorption space 61 may be formed between the edge of the battery case 2a and the chassis frame 5 by the engage flange 2b of the battery assembly 2.

Therefore, in an exemplary embodiment of the present invention, by easily absorbing and distributing the side impact load during side impact of the vehicle, damage to the battery assembly and occupant damage due to rotational deformation of the side sill may be minimized, and it is possible to maximize the width of the battery assembly 2 mounted on the underbody 1.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A vehicle body connection structure for connecting an underbody on which a battery assembly is mounted and an upper body, the vehicle body connection structure comprising:
   a plurality of main mounting portions engaging the battery assembly, a chassis frame on both sides of the underbody and side sills on both sides of the upper body along a length direction of the upper body through a main engage unit.

2. The vehicle body connection structure of claim 1, wherein the main mounting portions are connected to a lower part of a front pillar, a center pillar, and a rear pillar of the upper body.

3. The vehicle body connection structure of claim 1, wherein the chassis frame and the side sills comprise an aluminum extruded material and include closed sections partitioned by partition walls.

4. The vehicle body connection structure of claim 1, wherein the main engage unit comprises:
   a first blind nut attached to one of the side sills; and
   a first mounting bolt penetrating the battery assembly and the chassis frame and engaging the first blind nut.

5. The vehicle body connection structure of claim 1, further comprising a side sill trim coupled to an outside of the chassis frame.

6. A vehicle body structure comprising:
   an underbody;
   a battery assembly mounted on the underbody;
   an upper body coupled to the underbody; and
   a plurality of main mounting portions engaging the battery assembly, a chassis frame on both sides of the underbody and side sills on both sides of the upper body along a length direction of the upper body through a main engage unit.

7. The vehicle body structure of claim 6, further comprising a plurality of sub mounting portions engaging the battery assembly and the chassis frame through a sub engage unit between the main mounting portions.

8. The vehicle body structure of claim 7, wherein the sub engage unit comprises:
   a second blind nut coupled to the chassis frame; and
   a second mounting bolt penetrating the battery assembly and engaging the second blind nut.

9. The vehicle body structure of claim 7, wherein the battery assembly comprises an engage flange formed on an edge of a battery case of the battery assembly and engaged with the chassis frame by the main engage unit and the sub engage unit.

10. The vehicle body structure of claim 9, wherein an impact absorption space is formed between the edge of the battery case and the chassis frame.

11. The vehicle body structure of claim 9, further comprising a tooling pin provided on the engage flange and fitted to the chassis frame and one of the side sills.

12. A vehicle comprising:
   an underbody;
   a battery assembly mounted on the underbody;
   a chassis frame mounted on both sides of the underbody;
   an upper body coupled to the underbody, the upper body comprising a space frame and side sills on both sides of the upper body, wherein the upper body defines a cabin of the vehicle; and
   a plurality of main mounting portions engaging the battery assembly, the chassis frame and the side sills along a length direction of upper body through a main engage unit.

13. The vehicle of claim 12, further comprising a front pillar, a center pillar, and a rear pillar, wherein the main mounting portions are connected to lower parts of the front pillar, the center pillar, and the rear pillar.

14. The vehicle of claim 12, wherein the chassis frame and the side sills comprise an aluminum extruded material and include closed sections partitioned by partition walls.

15. The vehicle of claim 12, further comprising a side sill trim coupled to an outside of the chassis frame.

16. The vehicle of claim 12, wherein the main engage unit comprises:
   a first blind nut attached to one of the side sills; and
   a first mounting bolt penetrating the battery assembly and the chassis frame and engaging the first blind nut.

17. The vehicle of claim 12, further comprising a plurality of sub mounting portions engaging the battery assembly and the chassis frame through a sub engage unit between the main mounting portions, wherein the sub engage unit comprises:
   a second blind nut coupled to the chassis frame; and
   a second mounting bolt penetrating the battery assembly and engaging the second blind nut.

18. The vehicle of claim 17, wherein the battery assembly comprises an engage flange formed on an edge of a battery case of the battery assembly and engaged with the chassis frame by the main engage unit and the sub engage unit.

19. The vehicle of claim 18, wherein an impact absorption space is formed between the edge of the battery case and the chassis frame.

20. The vehicle of claim 18, further comprising a tooling pin provided on the engage flange and fitted to the chassis frame and the side sills.

\* \* \* \* \*